(12) United States Patent
Hirschberg et al.

(10) Patent No.: US 10,547,447 B2
(45) Date of Patent: Jan. 28, 2020

(54) COLLABORATIVE COMPUTATION OF HMAC

(71) Applicant: Cisco Technology, Inc., San Jose, CA (US)

(72) Inventors: Benyamin Hirschberg, Givat-Zeev (IL); Yaron Sella, Beit Nekofa (IL); Gilad Taub, Givat Zeev (IL)

(73) Assignee: Cisco Technology, Inc., San Jose, CA (US)

( * ) Notice: Subject to any disclaimer, the term of this patent is extended or adjusted under 35 U.S.C. 154(b) by 124 days.

(21) Appl. No.: 15/694,883

(22) Filed: Sep. 4, 2017

(65) Prior Publication Data

US 2018/0241550 A1 Aug. 23, 2018

(30) Foreign Application Priority Data

Feb. 19, 2017 (IL) .......................................... 250657

(51) Int. Cl.
*H04L 29/06* (2006.01)
*H04L 9/08* (2006.01)
*H04L 9/06* (2006.01)

(52) U.S. Cl.
CPC ............ *H04L 9/088* (2013.01); *H04L 9/0643* (2013.01)

(58) Field of Classification Search
CPC .......................... H04L 9/0643; H04L 2209/30
See application file for complete search history.

(56) References Cited

U.S. PATENT DOCUMENTS

| | | | | |
|---|---|---|---|---|
| 2005/0108533 A1* | 5/2005 | Ji | .................. | G06Q 20/3672 713/171 |
| 2010/0031052 A1* | 2/2010 | Kim | .................. | G06F 21/602 713/181 |
| 2010/0098255 A1* | 4/2010 | Ciet | .................. | H04L 9/0838 380/277 |
| 2011/0302418 A1* | 12/2011 | Fujisaki | .................. | H04L 9/3242 713/179 |
| 2014/0064483 A1 | 3/2014 | Fujisaki | | |
| 2014/0237237 A1 | 8/2014 | Brumley et al. | | |
| 2015/0098563 A1* | 4/2015 | Gulley | .................. | H04L 9/0643 380/28 |
| 2016/0261409 A1* | 9/2016 | French | .................. | H04L 9/3234 |
| 2017/0272251 A1* | 9/2017 | Osheter | .................. | H04L 63/061 |

OTHER PUBLICATIONS

Yasuda, HMAC without the second key, 2009, Springer-Verlag Berlin Heidelberg, 16 Pages (Year: 2009).*
Krawczyk, H. et al.; HMAC: Keyed-Hashing for Message Authentication (Feb. 1997), Network Working Group—RFC 2104.

\* cited by examiner

*Primary Examiner* — Christopher C Harris (57) ABSTRACT

In one embodiment, a first apparatus includes a processor and an interface, wherein the interface is operative to receive a request from a second apparatus to commence a keyed-hash message authentication code (HMAC) computation, the processor is operative to perform a first computation computing a first part of the HMAC computation using a secret key K as input yielding a first value, the interface is operative to send the first value to the second apparatus, the interface is operative to receive a second value from the second apparatus, the second value resulting from the second apparatus processing the first value with at least part of a message M, the processor is operative to perform a second computation based on the second value and the secret key K yielding an HMAC value, and the interface is operative to send the HMAC value to the second apparatus.

20 Claims, 5 Drawing Sheets

COLLABORATIVE COMPUTATION OF HMAC

TECHNICAL FIELD

The present disclosure generally relates to collaborative computation of a keyed-hash message authentication code (HMAC).

RELATED APPLICATION INFORMATION

The present application claims priority from Israel Patent Application S/N 250657 of Cisco Technology Inc. filed on 19 Feb. 2017.

BACKGROUND

In cryptography, a keyed-hash message authentication code (HMAC) is a specific type of message authentication code (MAC) involving a cryptographic hash function and a secret cryptographic key. It may be used to simultaneously verify both the data integrity and the authenticity of a message, as with any MAC. Any cryptographic hash function, such as SHA256 or SHA-3, may be used in the calculation of an HMAC. The resulting MAC algorithm is termed HMAC-SHA256 or HMAC-SHA-3 accordingly. The cryptographic strength of the HMAC depends upon the cryptographic strength of the underlying hash function, the size of its hash output, and on the size and quality of the key.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present disclosure, a first apparatus including a processor and an interface, wherein the interface is operative to receive a request from a second apparatus to commence a keyed-hash message authentication code (HMAC) computation, the processor is operative to perform a first computation computing a first part of the HMAC computation using a secret key K as input yielding a first value, the interface is operative to send the first value to the second apparatus, the interface is operative to receive a second value from the second apparatus, the second value resulting from the second apparatus processing the first value with at least part of a message M, the processor is operative to perform a second computation based on the second value and the secret key K yielding an HMAC value, and the interface is operative to send the HMAC value to the second apparatus.

There is also provided in accordance with another embodiment of the present disclosure, a first apparatus including a processor a first interface and a second interface, wherein the first interface is operative to send a request to a second apparatus to commence a keyed-hash message authentication code (HMAC) computation, and receive a first value computed by the second apparatus based on a secret key K, the processor is operative to perform a first computation computing a second value based on the first value and at least part of a message M as input, the first interface is operative to send the second value to the second apparatus, receive an HMAC value computed by the second apparatus based on the second value and the secret key K, and the second interface is operative to send the message M with the HMAC to a device.

DETAILED DESCRIPTION

Figure 1:
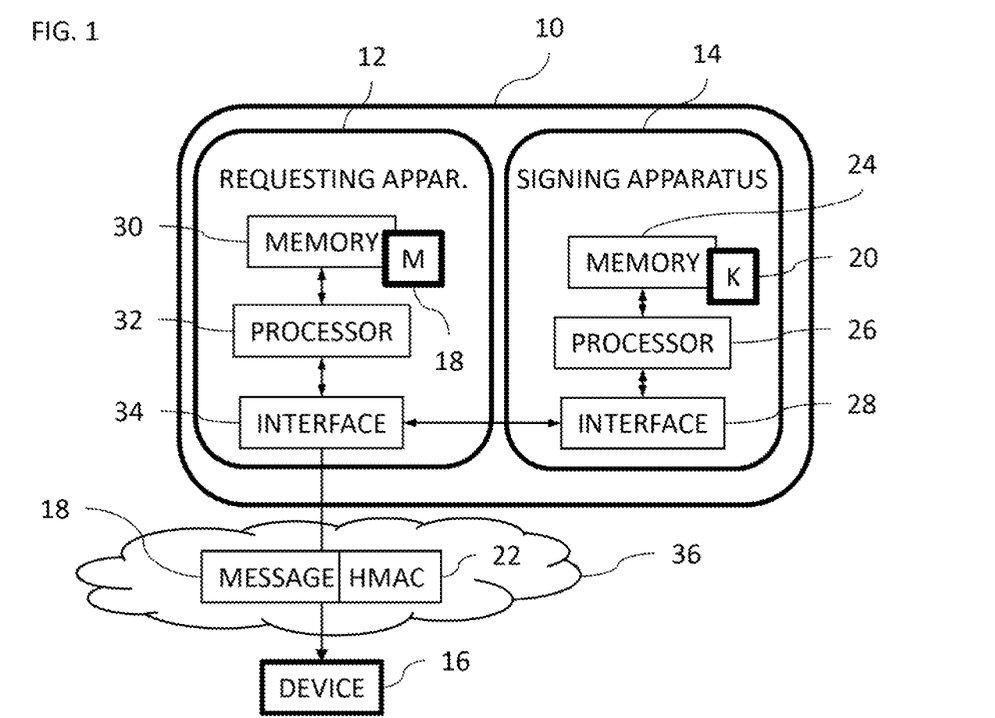
FIG. 1 is a block diagram view of an HMAC generation system constructed and operative in accordance with a first embodiment of the present disclosure.

Reference is now made to FIG. 1, which is a block diagram view of a keyed-hash message authentication code (HMAC) generation system 10 constructed and operative in accordance with a first embodiment of the present disclosure. The HMAC generation system 10 includes a requesting apparatus 12 and a signing apparatus 14. The requesting apparatus 12 is storing a message 18 (also referred to herein as message M) for sending to a device 16 with an HMAC 22 to secure the message 18. The message 18 may be sent via any suitable network 36, for example, but not limited to, a wireless network, a local area network, a wide area network, a cellphone network, the Internet or any suitable combination thereof. Although the requesting apparatus 12 stores the message 18, the requesting apparatus 12 does not have access to a secret key 20 (also referred to herein as secret key K) which is used in generation of the HMAC 22. The secret key 20 is held by the signing apparatus 14. The requesting apparatus 12 may not have access to the secret key 20 due to security reasons.

An HMAC is conventionally generated by a single processor. However, in the HMAC generation system 10 the HMAC 22 is generated collaboratively between separate processors, a processor 32 in the requesting apparatus 12 and a processor 26 in the signing apparatus 14 typically without the requesting apparatus 12 sending the message 18 (or at least not all of the message 18) to the signing apparatus 14 and without the signing apparatus 14 sending the secret key 20 to the requesting apparatus 12. Not sending the message 18 from the requesting apparatus 12 to the signing apparatus 14 for processing may result in bandwidth, processing and/or storage overhead savings. Additionally, the signing apparatus 14 may not have enough processing and/or storage capabilities to receive, process and/or store the message 18. The signing apparatus 14 may also not have communication functionality (such as a network transceiver or network interface) for communicating directly with the device 16. As mentioned above, due to security reasons the signing apparatus 14 may not be able to send the secret key 20 to the requesting apparatus 12. Therefore, in many embodiments of the present disclosure collaborative generation of the HMAC 22 by the requesting apparatus 12 and the signing apparatus 14 may be beneficial. It should be noted that the requesting apparatus 12 is "semi-trusted" in that the requesting apparatus 12 may not be trusted to possess the secret key 20 but may still be trusted to be a party in the generation of the HMAC 22.

By way of example only, the HMAC generation system 10 may include both an application central processing unit (ACPU) (implementing the requesting apparatus 12) and a security central processing unit (SCPU) (implementing the signing apparatus 14), for application and security purposes, respectively. The ACPU has access to an Ethernet interface and is operative to send messages which may need to be sent with appended HMACs. The SCPU has access to the secret key 20 for computing the HMACs. Due to security considerations, the SCPU is not operative to send the secret key 20 to the ACPU. Sending entire messages from the ACPU to the SCPU may not be practical, since the communication channel between the ACPU and the SCPU may become overloaded, leaving less bandwidth for other applications.

The signing apparatus 14 may include a secure processing chip by way of example only including a memory 24 and the processor 26. The memory 24 is operative to store the secret key 20 and data used by the processor 26 by way of example only. The signing apparatus 14 also includes an interface 28 for communicating with the requesting apparatus 12. The processor 26 and the interface 28 are described in more detail below with reference to FIG. 6. The requesting apparatus 12 includes a memory 30, the processor 32 and an interface 34. The memory 30 is operative to store the message 18 and data used by the processor 32, by way of example only. It should be noted that in the embodiment of FIG. 1, the signing apparatus 14 and the requesting apparatus 12 are disposed in the same device. The interfaces 28, 34 may be implemented as part of a data bus for communication within the HMAC generation system 10. The interface 34 may also include a transceiver for communicating with external devices such as the device 16. The interface 34 may be implemented as two interfaces, one for communicating with the requesting apparatus and one for communicating with devices external to the system 10, such as the device 16.

Figure 2:
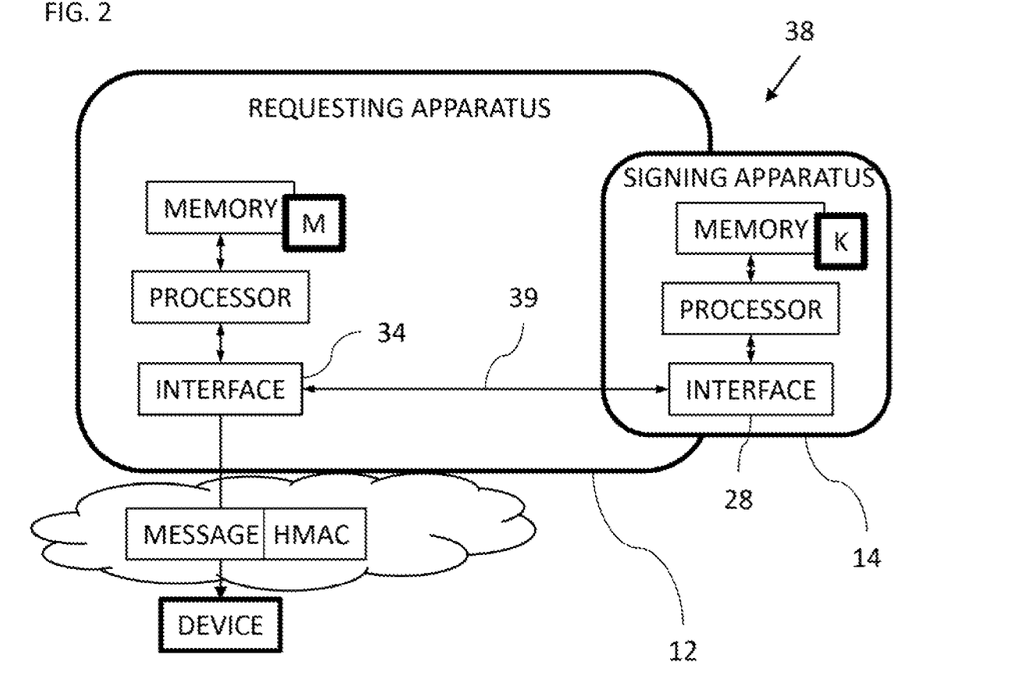
FIG. 2 is a block diagram view of an HMAC generation system constructed and operative in accordance with a second embodiment of the present disclosure.

Reference is now made to FIG. 2, which is a block diagram view of an HMAC generation system 38 constructed and operative in accordance with a second embodiment of the present disclosure. The HMAC generation system 38 is substantially the same as the HMAC generation system 10 of FIG. 1 except that the requesting apparatus 12 and the signing apparatus 14 are implemented as separate devices with the signing apparatus 14 being (removably) inserted into the requesting apparatus 12. By way of example only, the signing apparatus 14 may be implemented in a smart card including a secure processor and secure storage. A communication link 39 between the interfaces 28, 34 may be wireless and/or wired. The interface 34 may be implemented as two interfaces, one for communicating with the requesting apparatus and one for communicating with devices external to the system 10, such as the device 16.

Figure 3:
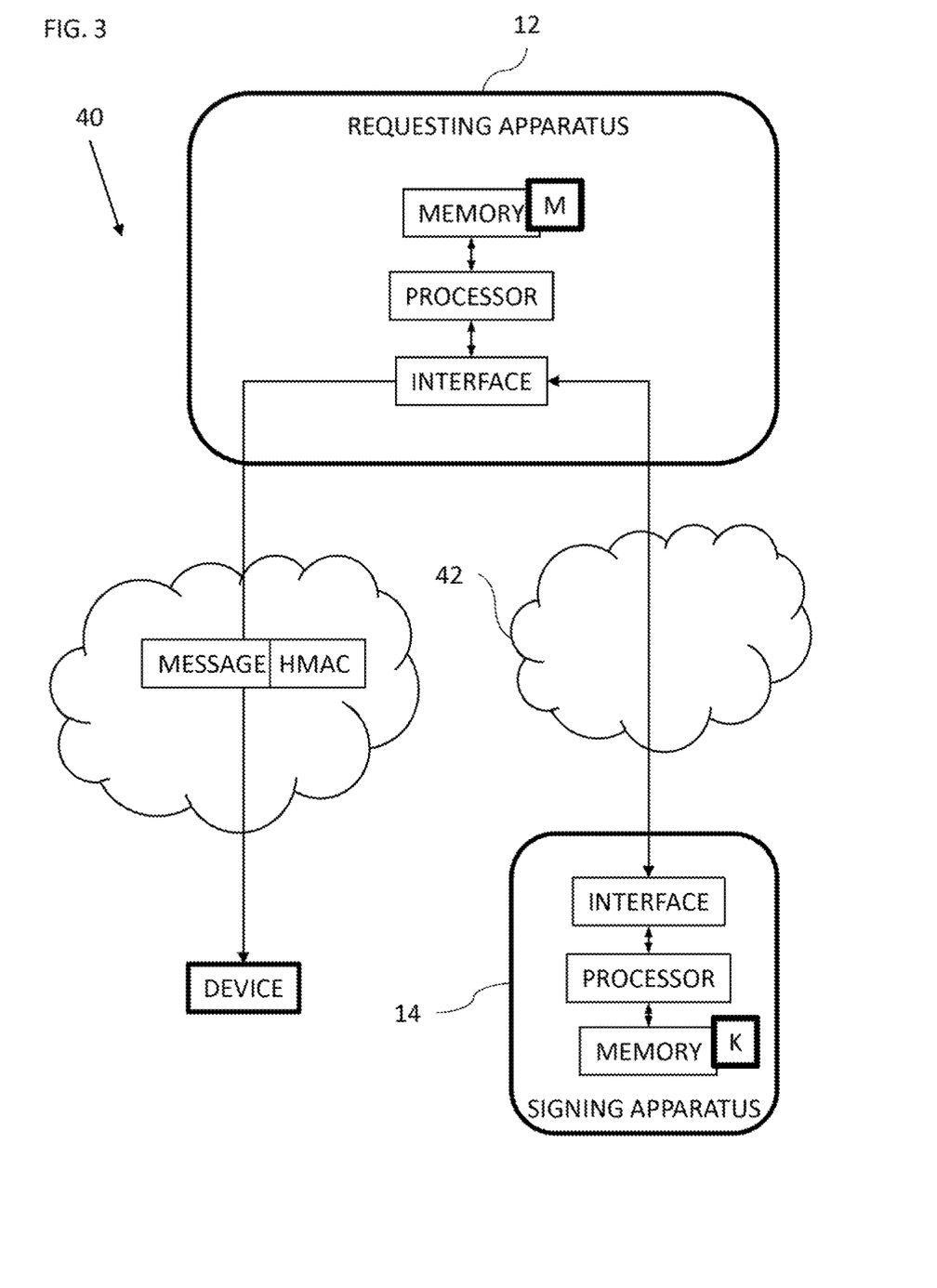
FIG. 3 is a block diagram view of an HMAC generation system constructed and operative in accordance with a third embodiment of the present disclosure.

Reference is now made to FIG. 3, which is a block diagram view of an HMAC generation system 40 constructed and operative in accordance with a third embodiment of the present disclosure. The HMAC generation system 40 is substantially the same as the HMAC generation system 10 of FIG. 1 except that the requesting apparatus 12 and the signing apparatus 14 are implemented as separate devices which are linked via a network 42, for example, but not limited to, a wireless network, a local area network, a wide area network, a cellphone network, the Internet or any suitable combination thereof. For example, the signing apparatus 14 may be implemented in a signing device for signing EIMACs for multiple devices.

Figure 4:
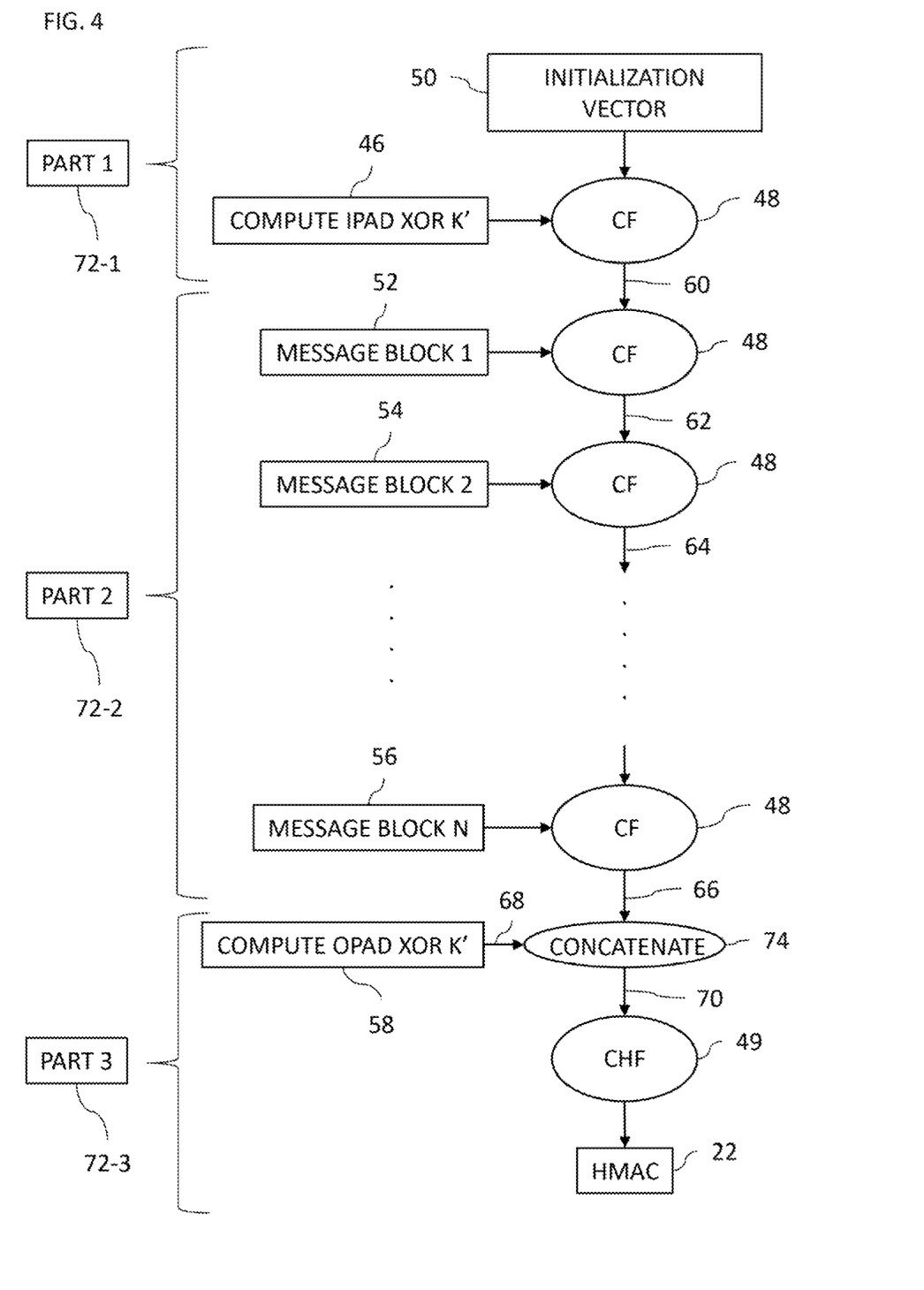
FIG. 4 is a flowchart showing exemplary steps in computing an HMAC in the system of FIG. 1.
Figure 5:
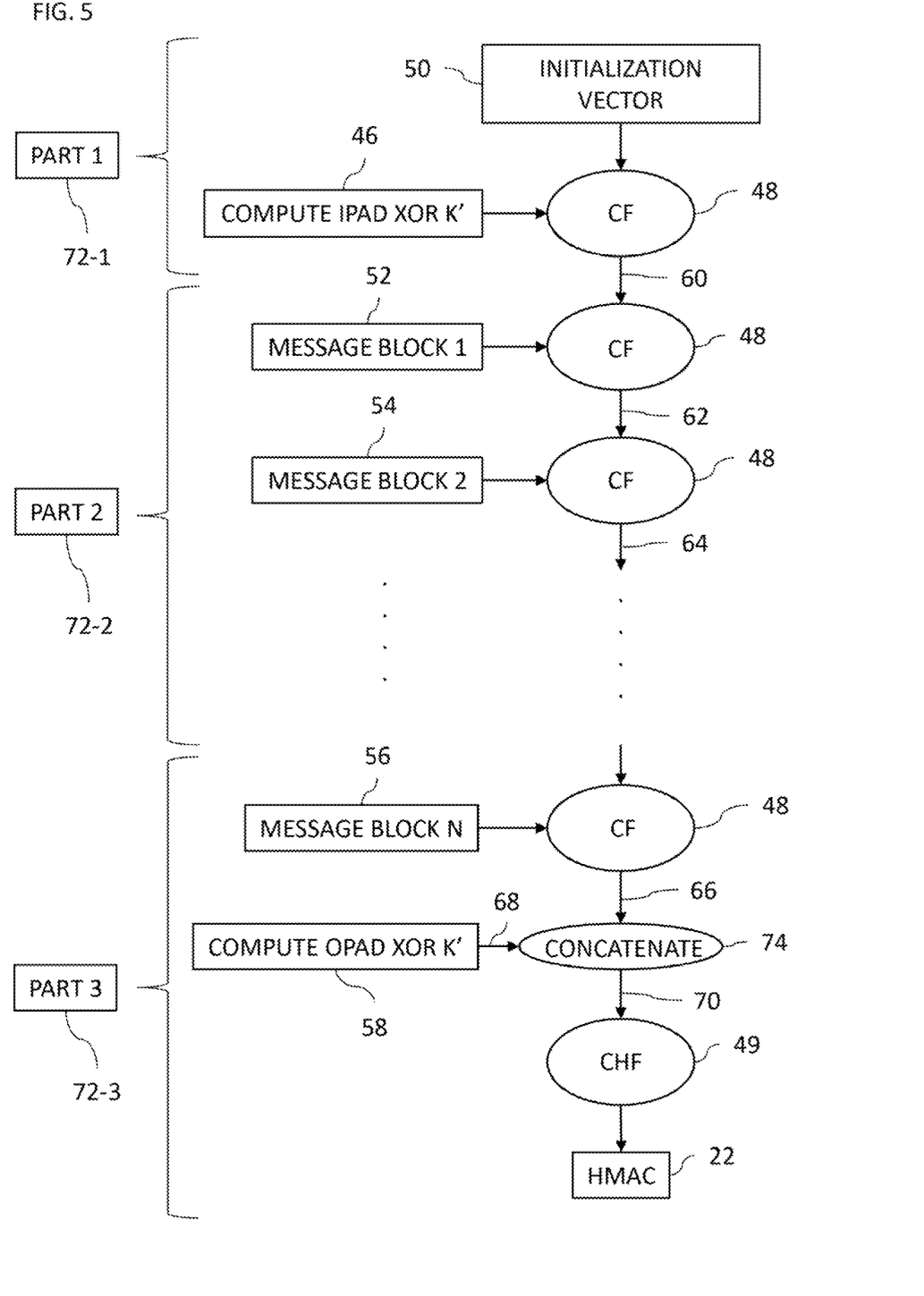
FIG. 5 is a flowchart showing an alternative grouping of the steps of computing an HMAC in the system of FIG. 1.
Figure 6:
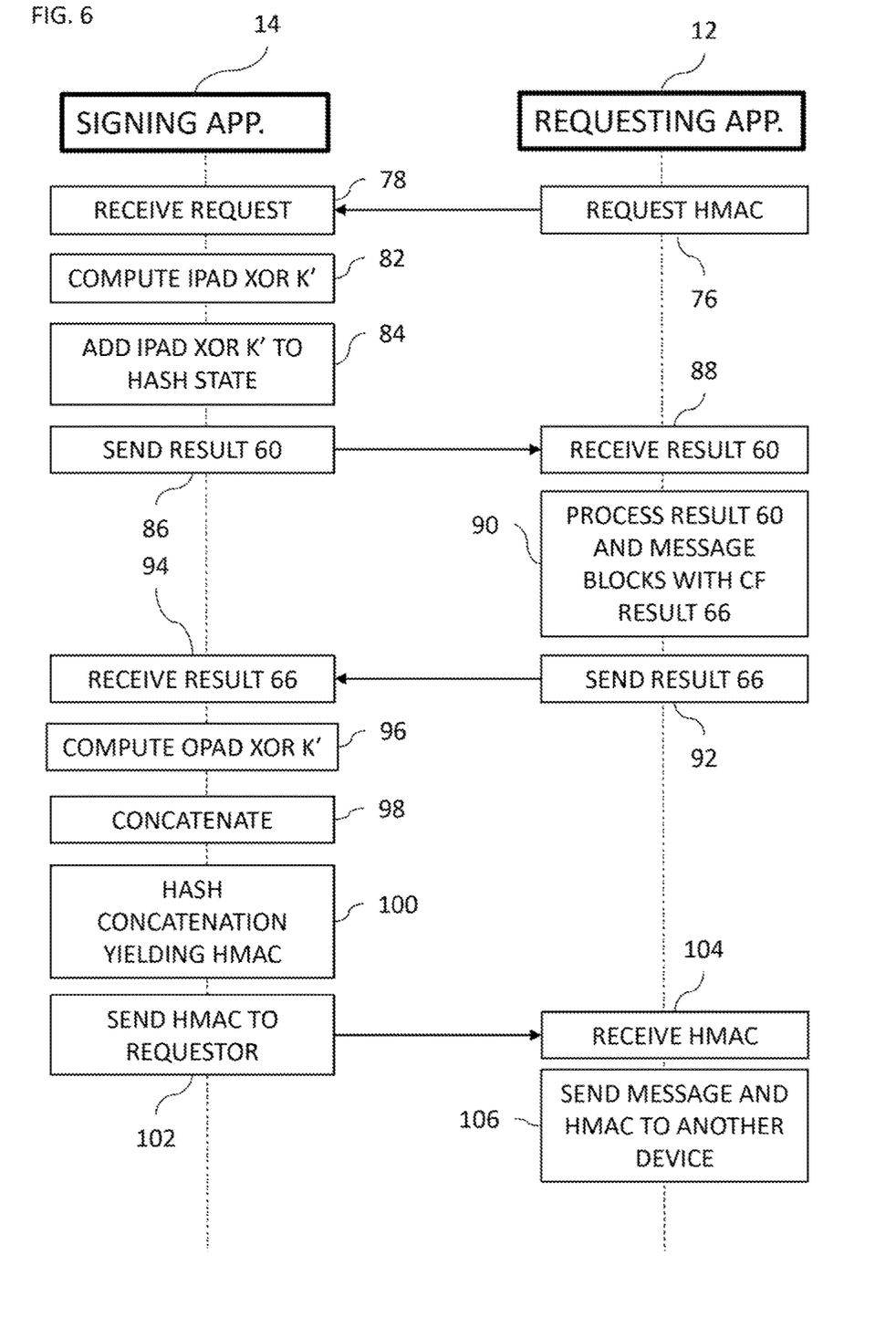
FIG. 6 is a flowchart showing exemplary steps in a method of operation of the system of FIG. 1.

Although, reference in FIGS. 4-6 is made to the HMAC generation system 10 of FIG. 1 it will be appreciated that the description may also be applied, mutatis mutandis, to the embodiments of FIGS. 2 and 3. Reference is now made to FIG. 4, which is a flowchart showing exemplary steps in computing the HMAC 22 in the system 10 of FIG. 1. The collaborative generation of the HMAC 22 is based on the design of many cryptographic hash functions (CHF) which is in turn based on the Merkle-Damgard construction. The Merkle-Damgard construction has the following properties among others. First, the cryptographic hash is computed in an iterative manner, such that the hash input is broken into fixed-size blocks (as will be illustrated below) using optional padding and these blocks are processed one by one, each one in turn modifying the CHF's internal state. Second, a compression-function (CF) that the CHF uses for processing a single block is meant to be collision resistant. Given that this is the case, the entire construction (namely, the iterative hashing of the blocks) is also collision resistant.

Before describing the steps in more detail, the HMAC computation is now briefly described based on request for comments (RFC) 2104 of the Internet Engineering Task Force. However, it will be appreciated that the HMAC generation system 10 may be used to compute HMACs which are non-compliant with RFC 2104. The HMAC computation defined by RFC 2104 is given by:

HMAC(M,K)=h[(opad XOR K')||h((ipad XOR K')||M)], where h( ) or h[ ] is a CHF used within the HMAC construction, K' is the version of the secret key K padded to the CHF block-size, ipad and opad are constants meant to create a large hamming distance between the two versions of K, XOR is an exclusive OR operation and || denotes concatenation.

The HMAC computation is now described in more detail with reference to FIG. 4. The value ipad XOR K' is computed (block 46) and the result of this computation and an initialization vector 50 is fed into a CF 48 of a CHF 49 yielding a result 60. The result 60 of the CF 48 is input into the CF 48 again with a first block 52 of the message M yielding a result 62. The result 62 of the CF 48 is input into the CF 48 again with a second block 54 of the message M yielding a result 64 and so on until all N blocks of the message M have been processed by the CF 48. FIG. 4 shows an $N^{th}$ block 56 of the message M and the previous output of the CF 48 being input into the CF 48. This stage of the CF 48 processing may also optionally include applying a finalization function depending on the choice of cryptographic algorithm being used. This stage of the CF 48 processing yields a result 66. Each time the CF 48 processes inputs the state of the CFH is updated. The value opad XOR K' is computed (block 58) yielding a result 68 which is concatenated (block 74) with the previous output of the CF 48, namely the result 66, yielding a result 70. The result 70 is input into the CHF 49 yielding the HMAC 22.

In the HMAC generation system 10 of FIG. 1, the HMAC computation described above is typically broken up into three main parts 72, namely part 1 (labelled 72-1), part 2 (labelled 72-2) and part 3 (labelled 72-3) in FIG. 4. Part 1 includes the step of block 46 and the initial processing of the CF 48 with the initialization vector 50. Part 2 includes adding the blocks of the message M to the hash state, block-by-block. Part 3 includes the computation of block 58, the concatenation of block 74 and the final hash operation by the CHF 49. It will be noted that part 1 uses the secret key K held by the signing apparatus 14. Part 1 is typically performed by the signing apparatus 14 and the result 60 is sent to the requesting apparatus 12 by the signing apparatus 14. It will be noted that part 2 uses the message M as input. Part 2 is typically performed by the requesting apparatus 12 and the result 66 is sent to the signing apparatus 14 by the requesting apparatus 12. It will be noted that part 3 uses the secret key K as input. Part 3 is typically performed by the signing apparatus 14 and the HMAC 22 is sent to the requesting apparatus 12. Therefore, the three parts 72 of the HMAC computation allow the HMAC to be computed collaboratively by the requesting apparatus 12 and the signing apparatus 14 without the signing apparatus 14 sending the secret key K to the requesting apparatus 12 and without the requesting apparatus 12 sending the message M to the signing apparatus 14.

Reference is now made to FIG. 5, which is a flowchart showing an alternative grouping of the steps of computing an HMAC in the system 10 of FIG. 1. FIG. 5 is the same as FIG. 4 except that the grouping of the steps is different. In FIG. 5, the $N^{th}$ block 56 is sent by the requesting apparatus 12 to the signing apparatus 14 with the previous output of the CF 48. The Nth block 56 and the previous output of the CF 48 is then processed with the CF 48 by the signing apparatus 14 to yield the result 66. This step is included in part 3 (labelled 72-3) in FIG. 5. Similarly any of the blocks of the message could be sent by the requesting apparatus 12 to the signing apparatus 14 for processing by the signing apparatus 14 with the CF 48 as long as not all of the blocks of the message are sent by the requesting apparatus 12 to the signing apparatus 14 and part of the hash state is updated by the requesting apparatus 12 due to the advantages described above.

Reference is now made to FIG. 6, which is a flowchart showing exemplary steps in a method of operation of the system 10 of FIG. 1. Reference is also made to FIG. 1. The interface 34 of the requesting apparatus 12 is operative to send a request to the signing apparatus 14 to commence a keyed-hash message authentication code (HMAC) computation (block 76).

The interface 28 of the signing apparatus 14 is operative to receive the request from the requesting apparatus 12 to commence the HMAC computation (block 78). The processor 26 of the signing apparatus 14 is operative to perform a computation computing a first part of the HMAC computation including processing a value based on the secret key K with the CF 48 (FIGS. 4, 5) of the CHF 49 (FIGS. 4, 5) yielding the result 60. This computation is now described in more detail below with reference to the steps of blocks 82 and 84. The processor 26 of the signing apparatus 14 is operative to compute an exclusive-OR operation of the value K' with a value (for example, but not limited to, ipad or any other suitable value which is the length of the block size used in the CF 48) yielding a result (block 82) which is added to the hash state by processing the result and the initialization vector 50 (block 84) with the CF 48 yielding the result 60 (FIGS. 4, 5). The value K' is based on the secret key K with padding. The value "ipad" is defined in RFC 2104 as the byte 0x36 repeated B times, where B is a block length of the CF 48. The interface 28 of the signing apparatus 14 is operative to send the result 60 to the requesting apparatus 12 (block 86).

The interface 34 of the requesting apparatus 12 is operative to receive the result 60 (block 88). The processor 32 of the requesting apparatus 12 is operative to perform a computation computing the result 66 (FIGS. 4, 5) based on the result 60 and part, or the whole, of the message M as input. The computation includes processing the result 60 and part, or the whole, of the message M on a block by block basis with the CF 48 (block 90) and optionally applying a finalization function as described in more detail above with reference to FIG. 4. The term "part of the message" as used in the specification and claims, is defined to include: part of the message data, but not all of the message data; or all of the body of the message but not including some of the data of the message, for example, but not limited to, meta data, headers, error correcting data, transport artifacts (e.g. IP related information. The interface 34 of the requesting apparatus 12 is operative to send the result 66 to the signing apparatus 14 (block 92).

The interface 28 of the signing apparatus 14 is operative to receive the result 66 from the requesting apparatus 12 (block 94), the result 66 resulting from the signing apparatus 14 processing the result 60 with part, or the whole, of the message M. The processor 26 of the signing apparatus 14 is operative to compute an exclusive-OR operation of the value K' with a value (for example, but not limited to opad or any other suitable value having a length equal to the block length of the CF 48 (FIGS. 4, 5)) yielding a value (block 96) which is then concatenated with the result 66 by the processor 26 (block 98). The value "opad" is defined in RFC 2104 as the byte 0x5C repeated B times. The processor 26 of the signing apparatus 14 is operative to perform a computation based on the result 66 and the secret key K yielding the HMAC value 22 (FIGS. 4, 5), the computation including computing a cryptographic hash of the result of the concatenation of block 98 yielding the HMAC value 22 (block 100). The interface 28 of the signing apparatus 14 is operative to send the HMAC value 22 to the requesting apparatus 12 (block 102).

The interface 34 of the requesting apparatus 12 is operative to receive the HMAC value 22 computed by the signing apparatus 14 based on the result 66 and the secret key K (block 104). The interface 34 of the requesting apparatus 12 is operative to send the message M with the HMAC value 22 to the device 16 (block 106).

As described above, the signing apparatus 14 does not have to reveal the secret key K to the requesting apparatus 12, but the signing apparatus 14 does reveal the result 60 (FIGS. 4, 5) to the requesting apparatus 12. Given the result 60, the requesting apparatus 12 generally cannot find K assuming the underlying CF is pre-image resistant. However, the result 60 allows the requesting apparatus 12 to perform CF calculations starting from the result 60. This theoretically reduces the security of HMAC (between the requesting apparatus 12 and the signing apparatus 14) to that of MAC(M,K)=MAC(MHK). This is theoretically weaker than HMAC( ), since it is vulnerable to searching for collisions on various messages starting from the result 60. However, in the system 10, this theoretical weakness may be irrelevant since the requesting apparatus 12 is trusted to provide the real message (as opposed to the message of an adversary) to the signing apparatus 14 for processing an HMAC of the message.

It will be appreciated that the signing apparatus 14 trusts the requesting apparatus 12 to the extent that the signing apparatus 14 is collaboratively creating HMACs for messages that the signing apparatus 14 does not receive. If this trusts breaks, for example if an adversary has gained control over the requesting apparatus 12, then the adversary may obtain HMACs for any message it wants. However, once the security hole used by the adversary to breach the requesting apparatus 12 is found and fixed, the system 10 as a whole becomes secure again, even without refreshing the secret key K. Refreshing K is recommended and it is generally also good practice to do it routinely, and even more so after a security breach.

In practice, some or all of the functions of the processor 26 may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory. It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure. The above paragraph also applies to the processor 32. It should be noted that the processors 26 and 32 are generally not combined into a single physical component.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:
1. A system comprising:
a first apparatus comprising: a first processor; a first memory to store a secret key K; and a first interface; and
a second apparatus comprising: a second processor; a second memory to store a message M including a first part and a second part; and a second interface communicatively coupled to the first interface, wherein:
the first interface is operative to receive from the second interface a request to commence a keyed-hash message authentication code (HMAC) computation that is to be performed collaboratively by the first apparatus and the second apparatus, and without the first apparatus sending the secret key K to the second apparatus;
the first processor is operative to perform a first computation computing a first part of the HMAC computation using the secret key K as input yielding a first value;
the first interface is operative to send to the second interface the first value;
the first interface is operative to receive from the second interface the second part of the message M, and a second value resulting from the second apparatus processing the first value with the first part of the message M;
the first processor is operative to perform a second computation based on the first part of the message M, the second value, and the secret key K yielding an HMAC value; and
the first interface is operative to send the HMAC value to the second interface for forwarding by the second apparatus to a device.

2. The system according to claim 1, wherein:
the first computation includes processing a third value with a compression function of a cryptographic hash function yielding the first value, the third value being based on the secret key K; and
the second computation includes computing a cryptographic hash of a concatenation of the second value with a fourth value yielding the HMAC value, wherein:
the fourth value is based on the secret key K; and the second value results from the second apparatus processing the first value and the first part of the message M with the compression function.

3. The system according to claim 2, wherein:
the first processor is operative to compute an exclusive-OR operation of a value K' with a fifth value yielding the third value, the value K' being a value based on the secret key K; and
the first processor is operative to compute an exclusive-OR operation of the value K' with a sixth value yielding the fourth value.

4. The system according to claim 3, wherein:
the fifth value is byte 0x36 repeated B times, B being a block length of the compression function; and
the sixth value is byte 0x5C repeated B times.

5. The system according to claim 1, wherein the first apparatus and the second apparatus are implemented as separate devices with the first apparatus being removable inserted into the second apparatus.

6. The system according to claim 5, wherein the first apparatus is implemented in a smart card.

7. The system according to claim 1, wherein the first interface and the second interface are communicatively coupled to each other over a network.

8. A system comprising:
a first apparatus comprising: a first processor; a first memory to store a message M including a first part and a second part; and a first interface; and
a second apparatus comprising: a second processor; a second memory to store a secret key K; and a second interface communicatively coupled to the first interface, wherein:
the first interface is operative to: send to the second interface a request to commence a keyed-hash message authentication code (HMAC) computation that is to be performed collaboratively by the first apparatus and the second apparatus, and without the second apparatus sending the secret key K to the first apparatus; and receive from the second interface a first value computed by the second apparatus based on the secret key K;
the first processor is operative to perform a first computation computing a second value based on the first value and the first part of the message M as input;
the first interface is operative to: send to the second interface the second value and the second part of the message M; and receive from the second interface an HMAC value computed by the second apparatus based on the second value, the second part of the message M, and the secret key K; and the second interface is operative to send the message M with the HMAC value to a device.

9. The system according to claim 8, wherein:
the first value is based on a processing a third value, which is based on the secret key K, with a compression function of a cryptographic hash function;
the HMAC value is based on a cryptographic hash of a concatenation of the second value with a fourth value which is based on the secret key K; and
the first computation includes processing the first value and the first part of the message M with the compression function.

10. The system according to claim 9, wherein:
the third value is based on an exclusive-OR operation of a value K' with a fifth value, the value K' being a value based on the secret key K; and
the fourth value is based on an exclusive-OR operation of the value K' with a sixth value.

11. The system according to claim 10, wherein:
the fifth value is byte 0x36 repeated B times, B being a block length of the compression function; and
the sixth value is byte 0x5C repeated B times.

12. The system according to claim 8, wherein the first interface and the second interface are communicatively coupled to each other over a network.

13. A method performed by a system including a first apparatus having a first processor, a first memory to store a secret key K, and a first interface, and a second apparatus including a second processor, a second memory to store a message M including a first part and a second part, and a second interface communicatively coupled to the first interface, the method comprising:
at the first interface, receiving from the second interface a request to commence a keyed-hash message authentication code (HMAC) computation that is to be performed collaboratively by the first apparatus and the second apparatus, and without the first apparatus sending the secret key K to the second apparatus;
at the first processor, performing a first computation computing a first part of the HMAC computation using the secret key K as input yielding a first value;
at the first interface, sending to the second interface the first value;
at the first interface, receiving from the second interface the second part of the message M, and a second value resulting from the second apparatus processing the first value with the first part of the message M;
at the first processor, performing a second computation based on the first part of the message M, the second value, and the secret key K yielding an HMAC value; and
at the first interface, sending the HMAC value to the second interface for forwarding by the second apparatus to a device.

14. The method according to claim 13, wherein:
performing the first computation includes processing a third value with a compression function of a cryptographic hash function yielding the first value, the third value being based on the secret key K; and
performing the second computation includes computing a cryptographic hash of a concatenation of the second value with a fourth value yielding the HMAC value, wherein: the fourth value is based on the secret key K; and the second value results from the second apparatus processing the first value and the first part of the message M with the compression function.

15. The method according to claim 14, further comprising:
computing an exclusive-OR operation of a value K' with a fifth value yielding the third value, the value K' being a value based on the secret key K; and
computing an exclusive-OR operation of the value K' with a sixth value yielding the fourth value.

16. The method according to claim 15, wherein:
the fifth value is byte 0x36 repeated B times, B being a block length of the compression function; and
the sixth value is byte 0x5C repeated B times.

17. A method performed by a system including a first apparatus having a first processor, a first memory to store a message M including a first part and a second part, and a first interface, and a second apparatus including a second processor, a second memory to store a secret key K, and a second interface communicatively coupled to the first interface, the method comprising:
at the first interface: sending to the second interface a request to commence a keyed-hash message authentication code (HMAC) computation that is to be performed collaboratively by the first apparatus and the second apparatus, and without the second apparatus sending the secret key K to the first apparatus; and receiving from the second interface a first value computed by the second apparatus based on the secret key K;
at the first processor, performing a first computation computing a second value based on the first value and the first part of the message M as input;
at the first interface: sending to the second interface the second value and the second part of the message M; and receiving from the second interface an HMAC value computed by the second apparatus based on the second value, the second part of the message M, and the secret key K; and
at the second interface, sending the message M with the HMAC value to a device.

18. The method according to claim 17, wherein:
the first value is based on a processing a third value which is based on the secret key K with a compression function of a cryptographic hash function;
the HMAC value is based on a cryptographic hash of a concatenation of the second value with a fourth value which is based on the secret key K; and
the first computation includes processing the first value and the at least first part of the message M with the compression function.

19. The method according to claim 18, wherein:
the third value is based on an exclusive-OR operation of a value K' with a fifth value, the value K' being a value based on the secret key K; and
the fourth value is based on an exclusive-OR operation of the value K' with a sixth value.

20. The method according to claim 19, wherein:
the fifth value is byte 0x36 repeated B times, B being a block length of the compression function; and
the sixth value is byte 0x5C repeated B times.

* * * * *

UNITED STATES PATENT AND TRADEMARK OFFICE
CERTIFICATE OF CORRECTION

PATENT NO. : 10,547,447 B2
APPLICATION NO. : 15/694883
DATED : January 28, 2020
INVENTOR(S) : Benyamin Hirschberg et al.

Page 1 of 1

It is certified that error appears in the above-identified patent and that said Letters Patent is hereby corrected as shown below:

In the Claims

Claim 18, Column 10, Line 51, please replace "and the at least first part" with --and the first part--

Signed and Sealed this
Twenty-fourth Day of March, 2020

Andrei Iancu
*Director of the United States Patent and Trademark Office*